No. 853,848. PATENTED MAY 14, 1907.
L. S. WATRES.
BRAKE.
APPLICATION FILED AUG. 19, 1905.
3 SHEETS—SHEET 1.
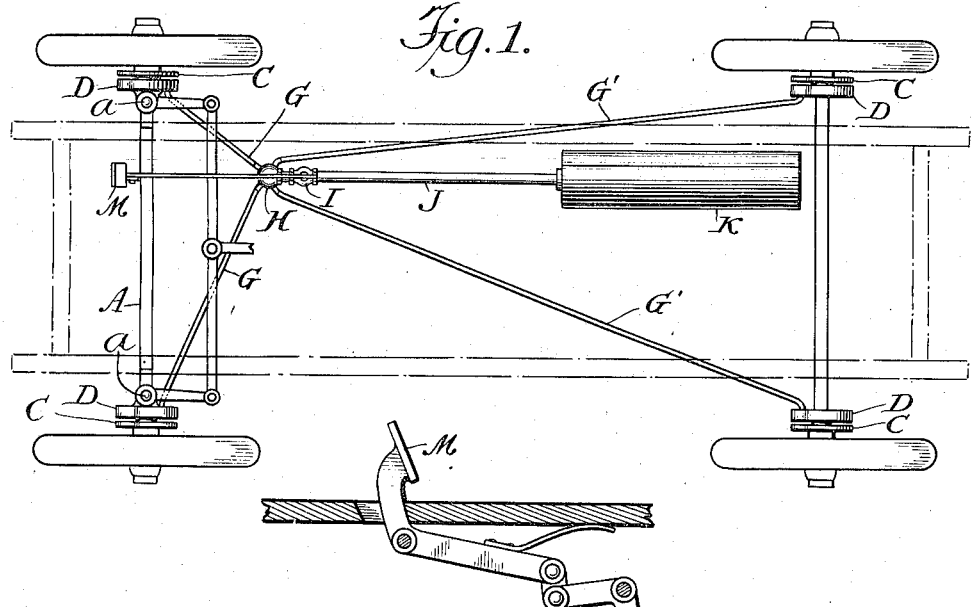
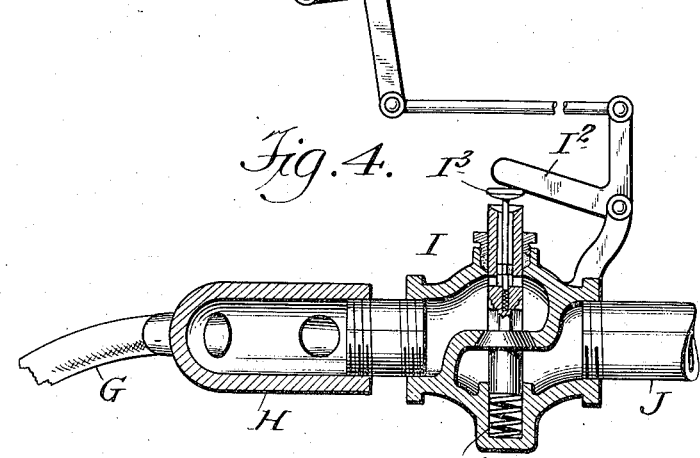
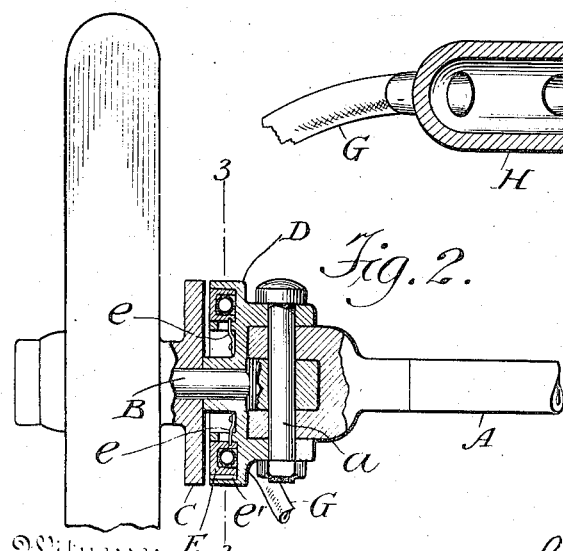
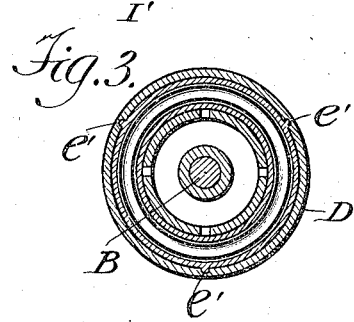
Witnesses
A R Appleman
L T Browning
Lewis S Watres Inventor
By his Attorney
Edward C Davidson

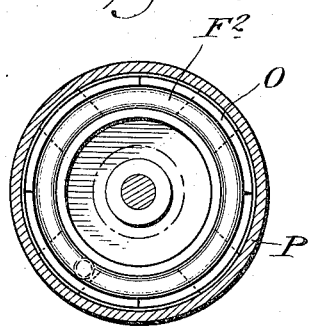
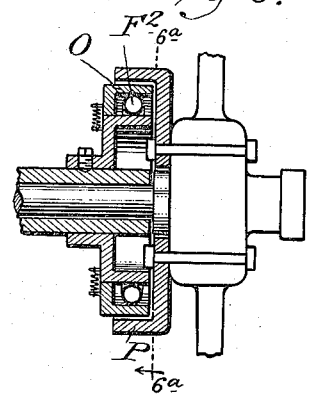
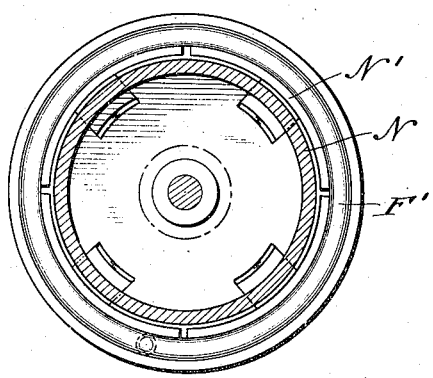
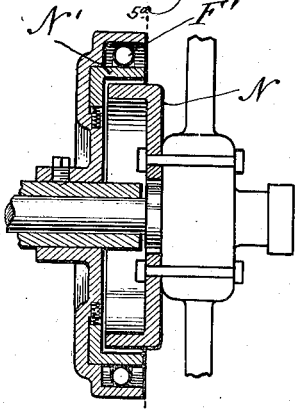
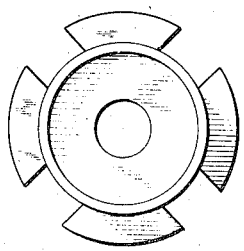
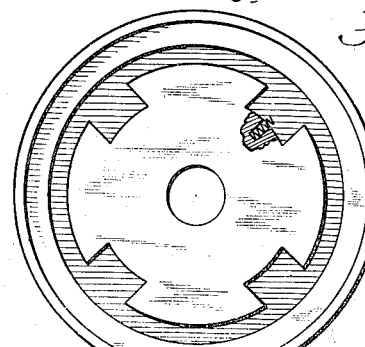

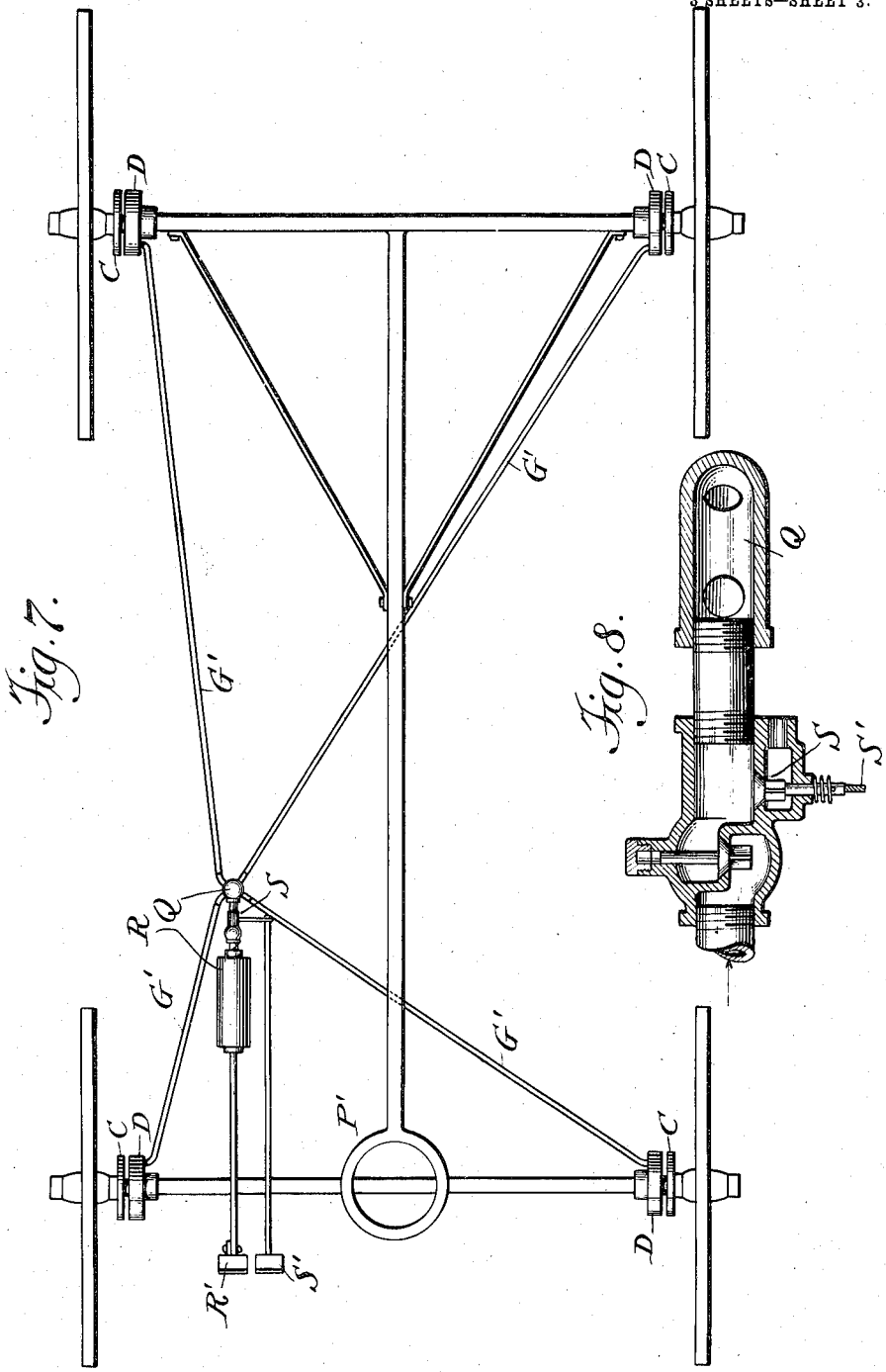

UNITED STATES PATENT OFFICE.

LEWIS S. WATRES, OF SCRANTON, PENNSYLVANIA, ASSIGNOR OF FIFTY-ONE ONE-HUNDREDTHS TO ROBERT C. ADAMS, OF SCRANTON, PENNSYLVANIA.

BRAKE.

No. 853,848.　　　Specification of Letters Patent.　　　Patented May 14, 1907.

Application filed August 19, 1905. Serial No. 274,946.

*To all whom it may concern:*

Be it known that I, LEWIS S. WATRES, a citizen of the United States, residing at Scranton, county of Lackawanna, Pennsylvania, have invented certain new and useful Improvements in Brakes, of which the following is a specification.

This invention comprises a brake for vehicles in which the braking surfaces are pressed into contact by inflation of a flexible collapsible member that preferably is in the form of an annular tube similar to that of a bicycle tire. A fluid under pressure, such as air, or the exhaust products of an internal combustion engine employed to propel the vehicle, may be stored in a tank to which the inflatable brake device is connected through a suitable cock under the control of the occupant. The connections from the source of fluid under pressure, or from the valve controlling it, to the inflatable brake member may be flexible and therefore the system is adapted to braking both the leading, as well as the rear wheels, of an automobile.

In the accompanying drawings: Figure 1 is a plan view of so much of an automobile running gear as is necessary to illustrate this invention: Fig. 2, an enlarged detail view partly in section illustrating the application of this brake device to the front wheel of an automobile: Fig. 3, a section on the line 3, 3, of Fig. 2: Fig. 4, an enlarged detail view of a valve for controlling admission to the inflatable brake members of fluid under pressure: Fig. 5 illustrates the application of an inflatable brake member applied to a brake strap working against the periphery braking drum: Fig. 5$^a$ is a vertical section of a brake on line 5$^a$—5$^a$, in Fig. 5; Fig. 5$^b$ is a face view of the stationary casing, secured to the bearing of the shaft of the wheels. Fig. 6 illustrates the application of the inflatable member to the interior of a friction band which is pressed outwardly against the inner face of a brake flange: Fig. 6$^a$ is a vertical section of a brake on line 6$^a$—6$^a$ of Fig. 6; Fig. 6$^b$ is a face view of the stationary casing, such as used in Fig. 5$^b$. Fig. 7 indicates the application of this invention to an ordinary horse-drawn vehicle: and Fig. 8, a detail sectional view of the valve devices thereof:

A is the front axle to which is hinged upon the vertical pivot bolt $a$, the wheel bearing or stud axle B upon which is mounted the carrying wheel. The hub of the wheel is provided with a brake flange C fast thereon. Inside this flange and loose upon the stud axle B is a disk D having a projecting collar through which the vertical pivot bolt $a$ passes. C and B both therefore swing about the axis at $a$. The disk D is provided with an annular channel adjacent its periphery in which is fitted an annular three-sided brake shoe E, the open side of which faces the bottom of the channel. Springs $e$ attached to the web of the disk pass through apertures in the wall forming the annular channel and engage the brake shoe E so that their reaction tends to withdraw the shoe from contact with the face of flange C. The brake shoe is held against rotation by ribs $e'$ upon its periphery which fit in longitudinal channels in the inner face of the outer wall of the channel in which the shoe is seated. Disposed within the brake shoe is an annular inflatable and collapsible flexible tube which may be of the construction of a bicycle tire. This tube is connected by a flexible coupling pipe G with a box or chamber H communicating through a valve I and pipe J with a tank K.

The tank may be supplied with fluid under pressure in any appropriate way either by air compressed therein by an appropriate pump or by the exhaust products of the internal combustion driving motor of the vehicle. The rear wheels may be each provided with a flange C turning with the wheel and with the disk D and associated parts fast upon the axle and, to the inflatable members of which, the box H is connected by flexible coupling tubes G'. The tubes G are made of such length as to accommodate the maximum swing of the leading wheels. When the valve I is opened fluid under pressure passes from the tank K to the several inflatable members F of the brake devices and the brakes are applied simultaneously to all of the wheels. When the valve is allowed to close, the inflatable brake devices are deflated in an appropriate way. A suitable form of valve for the practice of this invention is shown in Fig. 4. The spindle thereof is normally urged upwardly to close the valve by a spring I' and the valve may be opened by downward pressure of an arm I$^2$ forming part of a pivoted elbow lever which, by means of suitable links and cranks, as shown, is under the control of a pedal M adapted to be operated by the driver. The valve stem above the valve is made hollow and is fitted with a puppet valve I³ opening outwardly so that when the parts are relieved of the pressure of the arm I², the puppet valve opens and the inflatable members F are simultaneously deflated.

The form in which the invention is illustrated is deemed to be practicable and efficient but various other embodiments of the principle of this invention may be devised by those familiar with such matters.

Fig. 5 shows an ordinary automobile brake drum N surrounded by a brake strap N'. In the application of this invention to that type of brake, the inflatable member F' is placed around the strap and acts, when inflated, to force it into contact with the periphery of the brake drum.

Fig. 6 shows an arrangement the reverse of that indicated in Fig. 5. The inflatable member F² is placed within the expansible brake member O which is forced by it against the inner surface of a braking flange P.

Fig. 7 indicates an ordinary vehicle having the usual fifth wheel P'. Each wheel is provided with the parts C, D, brake shoe and inflatable member. The inflatable members are connected by pipes G', G', with a small compressed air chamber Q into which air may be compressed by means of an ordinary air pump R equipped with a check valve and operated by a treadle R' within convenient reach of the driver until sufficient pressure of the braking surfaces is attained. When the brakes are to be thrown off, the inflatable members thereof are deflated through a valve S actuated by a hand or foot operating arm S' under control of the driver.

In Figs. 5, 5ª and 5ᵇ is shown a type of brake in which the inflatable member F' acts, when inflated, against the outer surface of contacts N' pressing those inwardly against the outer surface of the brake drum. The contacts N' are made as shown in Fig. 5ª in the form of segmental pieces each having a rectangular extension to slide within recesses in the stationary casing and kept out of contact with the brake drum by springs.

Figs. 6, 6ª and 6ᵇ, show a modification in reverse of the construction shown in Figs. 5, 5ª and 5ᵇ. The inflatable member F² is to be pressed against the inner surface of contacts o, thereby pressing the latter outwardly against the inner surface of the brake drum.

I claim as my invention:

1. The combination with the swinging front wheel of a motor-driven vehicle, of a braking surface rotating and swinging with the wheel, a non-rotary brake shoe also swinging with the wheel and an inflatable brake applying member acting when inflated to bring the shoe and braking surface into operative engagement.

2. The combination with the swinging front wheel of a motor-driven vehicle, of a braking surface rotating and swinging with the wheel, a non-rotary brake shoe also swinging with the wheel, and an inflatable brake applying member acting when inflated to bring the shoe and braking surface into operative engagement, a source of fluid under pressure for inflating said member and a flexible coupling between such source and inflatable member.

In testimony whereof, I have hereunto subscribed my name.

LEWIS S. WATRES.

Witnesses:
GEO. N. GOODSON,
J. A. COYLE.